(12) United States Patent
Bisdikian et al.

(10) Patent No.: US 7,899,912 B2
(45) Date of Patent: Mar. 1, 2011

(54) PERVASIVE, PERSONAL DATA INTERACTIVITY OVER VOICE-GRADE CIRCUIT-SWITCHED CELLULAR NETWORKS

(75) Inventors: Chatschik Bisdikian, Chappaqua, NY (US); William F. Jerome, Elmsford, NY (US); Mahmoud Naghshineh, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 840 days.

(21) Appl. No.: 09/933,625

(22) Filed: Aug. 21, 2001

(65) Prior Publication Data

US 2003/0041119 A1 Feb. 27, 2003

(51) Int. Cl.
*G06F 15/16* (2006.01)

(52) U.S. Cl. ........................ 709/227; 709/217; 709/226; 709/213; 709/219

(58) Field of Classification Search ................. 709/219, 709/208, 212, 230, 203, 217, 213, 226, 227; 370/329; 455/414.1, 432
See application file for complete search history.

(56) References Cited

U.S. PATENT DOCUMENTS

| | | | | |
|---|---|---|---|---|
| 5,787,363 A | * | 7/1998 | Scott et al. | 455/557 |
| 5,886,732 A | * | 3/1999 | Humpleman | 725/49 |
| 6,308,213 B1 | * | 10/2001 | Valencia | 709/229 |
| 6,724,868 B2 | * | 4/2004 | Pradhan et al. | 379/90.01 |
| 6,735,619 B1 | * | 5/2004 | Sawada | 709/212 |
| 6,988,070 B2 | * | 1/2006 | Kawasaki et al. | 704/275 |
| 7,092,699 B1 | * | 8/2006 | Hefter | 455/414.1 |
| 2002/0068559 A1 | * | 6/2002 | Sharma et al. | 455/423 |
| 2002/0091784 A1 | * | 7/2002 | Baker et al. | 709/208 |
| 2002/0191557 A1 | * | 12/2002 | Chow et al. | 370/329 |
| 2002/0191635 A1 | * | 12/2002 | Chow et al. | 370/463 |
| 2003/0027569 A1 | * | 2/2003 | Ejzak | 455/432 |

OTHER PUBLICATIONS

Smart Antenna for wireless communictions: IS-95 and third Generation CDMA APplication, Liberti et al, Apr. 12, 1999.*

* cited by examiner

*Primary Examiner*—Djenane M Bayard
(74) *Attorney, Agent, or Firm*—Law Offices of Ira D. Blecker, P.C.

(57) ABSTRACT

Provides methods and apparatus for accessing and controlling services, such as home automation services, visually employing established wireless, cellular telecommunication technologies for voice communications. In example embodiments, users of personal portable devices connect to services over dial-up, wireless, cellular, circuit-switched voice telephone networks, receive and display listings of available services and use these listings to access and manipulate the services.

36 Claims, 4 Drawing Sheets

PERVASIVE, PERSONAL DATA INTERACTIVITY OVER VOICE-GRADE CIRCUIT-SWITCHED CELLULAR NETWORKS

FIELD OF THE INVENTION

This invention is directed to the field of telephone networks. It is more particularly directed to cellular telephony as a means for remotely accessing and/or manipulating information and processes.

BACKGROUND

The use of cellular telephony has become an everyday experience for a lot of people. Cellular telephony permits users to have access to voice services (make calls, receive calls, access voice mail, teleconference, and so on) from practically everywhere without the need to be located next to a fixed wireline telephone, or wait for a telephone booth to become available.

However, the use of fixed-line telephony has some compelling advantages. A telephone number associated with a fixed telephone can be "tied" to the environment in which this telephone is located. Thus, the telephone number of a fixed-line telephone in a home can be used as an identifier of that home. This indeed happens today when, for example, various providers of residential services, e.g., water, electricity, and CaTV public utilities, home heating oil and newspaper delivery services, and so on, use a telephone number as a distinguishing identifier of the recipient of the residential service. Even more so, the advent of the tone telephony signaling and the caller ID feature has permitted the development of a number of applications that permit one to use telephony as a means to access controllable services, like home automation facilities, remotely. For example, this is achieved by installing a telephony-enabled device in a home and connect it to an available public switched telephone network (PSTN) jack in the home. The ring signal generated when calling the telephone number for this PSTN jack could activate a device which then could receive commands remotely by sending it tones generated by a tone dialing telephone (not unlike the practically ubiquitous touch-tone, voice response, interactive services). Doing so, one can use such a system to, say, activate environmental control (heat/AC) services remotely.

One drawback for these purely telephony-based, home devices are that they have limited, if any, capabilities in providing "feedback" or status information for the devices that they control. Interactivity using visual means and in particular textual and graphics means could greatly enhance user experience in accessing remotely and controlling processes that interest various users.

Recently, a new generation of cellular phones have been introduced that take advantage of data cellular services, which is a distinct service from cellular voice telephony, to display data information provided to them by cellular data service and content providers. This information is shown on small displays (typically, 4 to 5 20-character lines) on these cellular phones. These cellular phones are some times called web-phones as the data services provided on them resemble the point-and-click experience and the information collecting and searching capabilities encountered on the Worldwide Web (WWW) using a web-browser on a notebook or desktop computer. Sometimes these phones are also called WAP phones, since a good number of them are using the Wireless Application Protocol (WAP) communications protocol suite for carrying the data services to the phones.

Data services on cellular phones focus primarily on e-commerce applications (purchasing of goods through "e-tailers" with presence on the Web), on-line banking, news, stock quote announcements, e-mail and messaging, audio/video downloads, and so on. All these services on the "wireless Web," a term that we would use without necessary implying the use of the WWW, WAP, etc., protocols, allow the users of the wireless Web to contact businesses, and/or retrieve and manipulate business related information, and/or retrieve casual information (e.g., sports news broadcasting) from service and content providers.

It would be advantageous to further enhance the usability of the wireless Web by providing a capability to use one's personal communication devices, e.g., the cellular phone, to access and manipulate information and processes that they do not necessarily fall in the traditional e-commerce/e-business category.

SUMMARY OF THE INVENTION

It is therefore an aspect of the present invention to provide methods and apparatus by which a user accesses that user's home automation system remotely and/or interactively over a long-haul wireless connection.

It is another aspect of this invention to provide visual interactive capability through one's personal device, using a cellular, voice telephony technology, like first and/or second generation cellular telephony systems, without the need to upgrade or modify the existing circuit switched wireless and wireline telephony infrastructure. Clearly, those skilled in the art could apply these concepts for additional instances of use of this invention without departing from the spirit of this invention.

BRIEF DESCRIPTION OF THE DRAWINGS

These and other aspects, features, and advantages of the present invention will become apparent upon further consideration of the following detailed description of the invention when read in conjunction with the drawing figures, in which.

DESCRIPTION OF THE INVENTION

The present invention provides a means for a user to access that user's home automation system remotely and/or interactively over a long-haul wireless connection. It also provides methods and apparatus affording visual interactivity capability through one's personal device, using established cellular, voice telephony technologies, like first and second generation cellular telephony systems, without the need to upgrading or modifying the existing circuit switched wireless and wireline telephony infrastructure. Clearly, those skilled in the art could build additional instances of this invention without departing the spirit of this invention. Even though this invention does not restrict itself only to this application, accessing one's home automation system remotely and interactively over a long-haul wireless connection provides a fine example for visualizing an objective of this invention.

Figure 1:
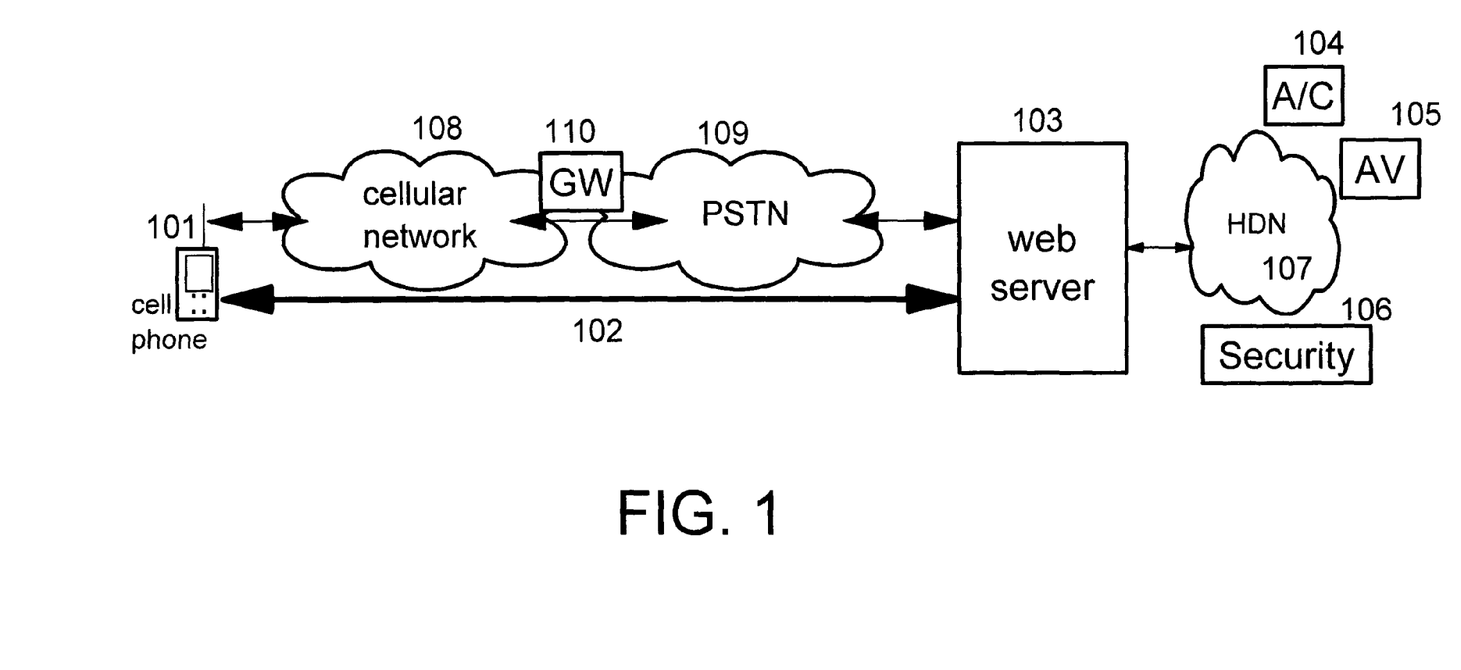
FIG. 1 shows an example of a communications scenario considered in a first embodiment of this invention using regular cellular and PSTN circuit switched technology to access an interactive home server and data distribution network.

FIG. 1 shows a first embodiment of an example of the present invention. The figure shows the access of a home data distribution network (HDN) through a cellular phone using no other infrastructure other than a regular circuit-switched cellular and PSTN networks. The cellular phone 101 is a web-phone able to show HTML web pages, like a smartphone from Kyocera. The phone can connect 102 to a home server with access to a web server 103 which is able to send, receive, and process HTML web pages. Through the web server access is provided to individual services 104, 105, 106 in the home through a home data distribution network (HDN) 107, e.g., a power line distribution network, in-home wireless network, etc. The connection to the home server is over a regular voice circuit-switched cellular phone network 108 and PSTN 109 which they are connected through a gateway 110 that allows the wireless and wireline portions of the telephone network to inter-work. This embodiment of the invention requires minimal infrastructure support in that it relies on already ubiquitously deployed circuit switched wireless and wireline telephone networks.

Figure 2:
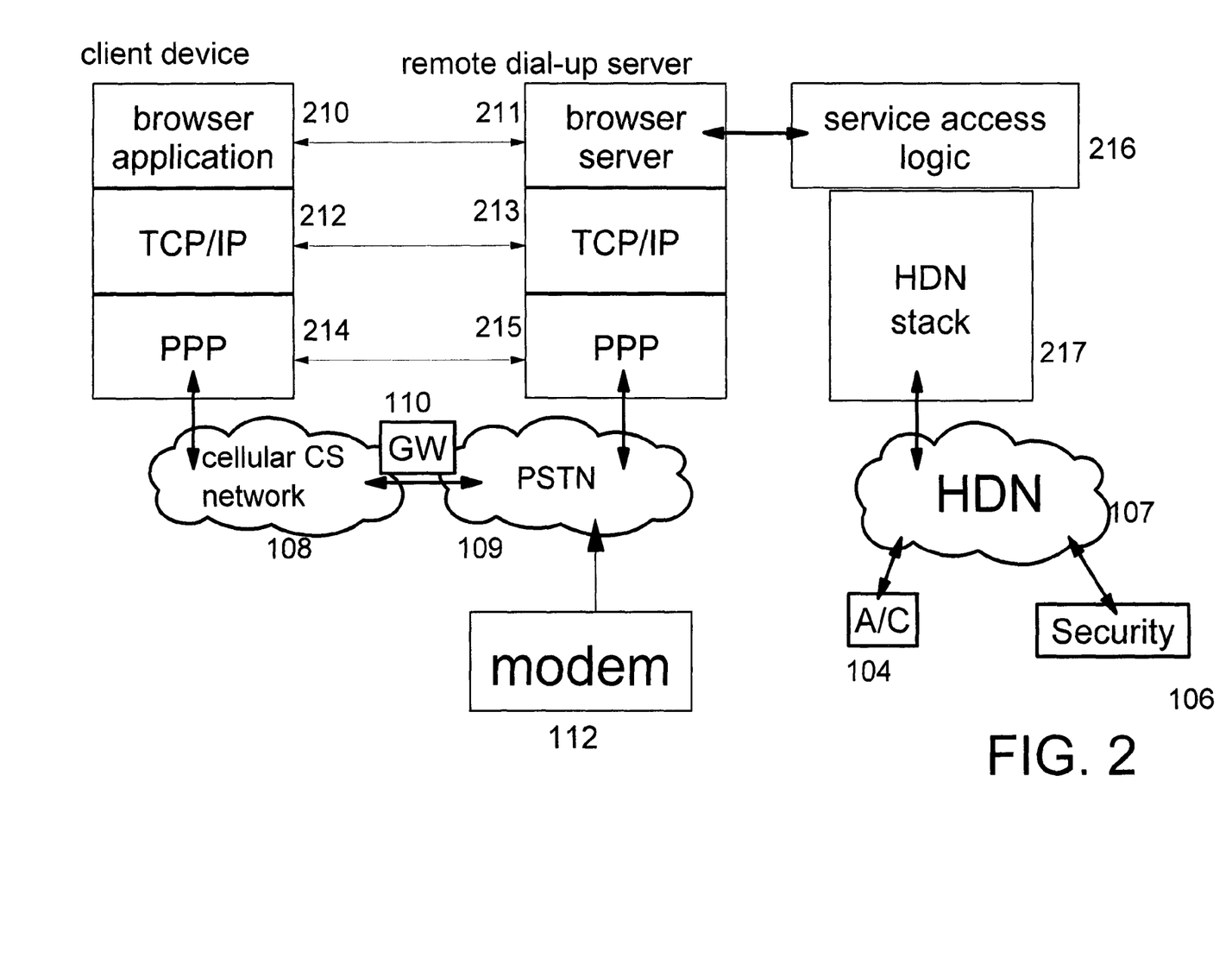
FIG. 2 shows an example of communication protocol stacks involved in the first embodiment.

FIG. 2 depicts the stacks of communication protocols involved in this first embodiment. In FIG. 2, we use the term client device, to denote a device onto which one can view a browser application through which the remote home server is accessed. The client device could be a cellular phone with web browsing capabilities, or a PDA with browsing capabilities attached to a cellular phone, and so on. The client device is generally a personal, portable device that either natively or through another personal, portable device can access and control data applications using a regular circuit-switched cellular telephone network. While it is easier to visualize the client device and the data applications that it interacts with as a cellular phone and web-enabled services, these are not requirements for this invention and those skilled in the art may implement the concepts of this invention using means other than just a cellular phone and/or a web-server. Thus the term cellular phone and client device are used interchangeably herein.

In this embodiment, the cellular phone runs a browser application 210 which in turn runs on top of the TCP/IP protocol stack 212. The Point-to-Point protocol (PPP) 214 adapts the packet oriented TCP/IP stack to the serial nature of the underlying communications networks 108 and 109. To physically connect to the telephone networks, a modem 112 is required. The user of the cellular phone can dial-up directly into the server at home, which can be configured as a remote dial-up server, a feature that can be found on, for example, the Windows computer operating system from Microsoft. The PPP protocol layers 214 and 215 in the cellular phone and the home server allow the authentication of the end-to-end communications path between these two devices. Also, the PPP layer at the home server 215 aids in the automatic configuration of the TCP/IP stack at the cellular phone 212, e.g., by assigning an IP address to it. This permits the complementary TCP/IP layers in the cellular phone 212 and the server 213 to connect with each other over the virtual communications pipe formed by the two PPP layers 214 and 215 and inter-operate. Finally, the browser application 210 on the cellular phone can access the browser server 211 on the home server through the virtual communications pipe formed by the TCP/IP layers 212 and 213.

The service access logic 216 that is accessible through the browser server 211 includes the software modules, sometimes referred to as service agents, that can be used to control the various services. These service agents may be web-enabled themselves and thus accessible directly from the browser on the cellular phone. Otherwise, these service agents are web-server technologies, like common-gateway interface (CGI) or Java servlets computer programs that enable the browser server to interact with the services. Note that these agents may be active, i.e., running, at all times, or stored in a directory, say, an Lightweight Directory Access Protocol (LDAP) directory and be retrieved and activated only when a user wants to access a particular service.

The service access logic communicates with services 104, 106 using the home distribution network 107, which could be comprised a single network, say an 802.11 wireless local area network (WLAN), or an aggregation of networks, e.g., an 802.11 WLAN, an X-10 network, a twisted-pair telephone network, a Bluetooth piconet, and so on. The home distribution communications protocol stack 217 supports the communication protocols that are required to access the services over the various services available through HDN 107. This stack is not specified here. However, this stack can be either a universal one executed by each of the controlled device, e.g., based on the Jini technology from Sun Microsystems, or a set of nonstandard protocols optimized for the communication with each of the different services to be controlled.

The embodiment in FIG. 2 shows dialing up the remote dial-up server directly through the concatenation of a cellular and PSTN networks. However, those skilled in the art, may employ a solution in which the remote dial-up server is associated with a telephone number from a cellular phone provider as well. Furthermore, for transporting telephony signaling and other control data between the cellular phone and the remote dial-up server, a data network may be used in between, employing a technology like voice-over-IP (VoIP) for doing so. Such solutions do not depart the spirit of this invention.

In the previous embodiment, we made a use of a voice, circuit-switched, wireless telephone network to dial-in through the regular PSTN directly to the home server. This approach is very attractive as it generally requires the user to "subscribe" to nothing more that the regular telephony service providers.

While the remote dial-up server capability is natively available or externally added on several popular computer operating systems, its activation requires a user to configure his/her home server. However, user configuration of home computers may not be the first choice in many people's home chores. But, if the computer is connected to an Intranet supported by an ISP then the perils of a user incorrectly configuring the remote dial-up server can be avoided. This is accomplished by placing the remote dial-up server away from the home computer, possibly at an ISP premise.

Figure 3:
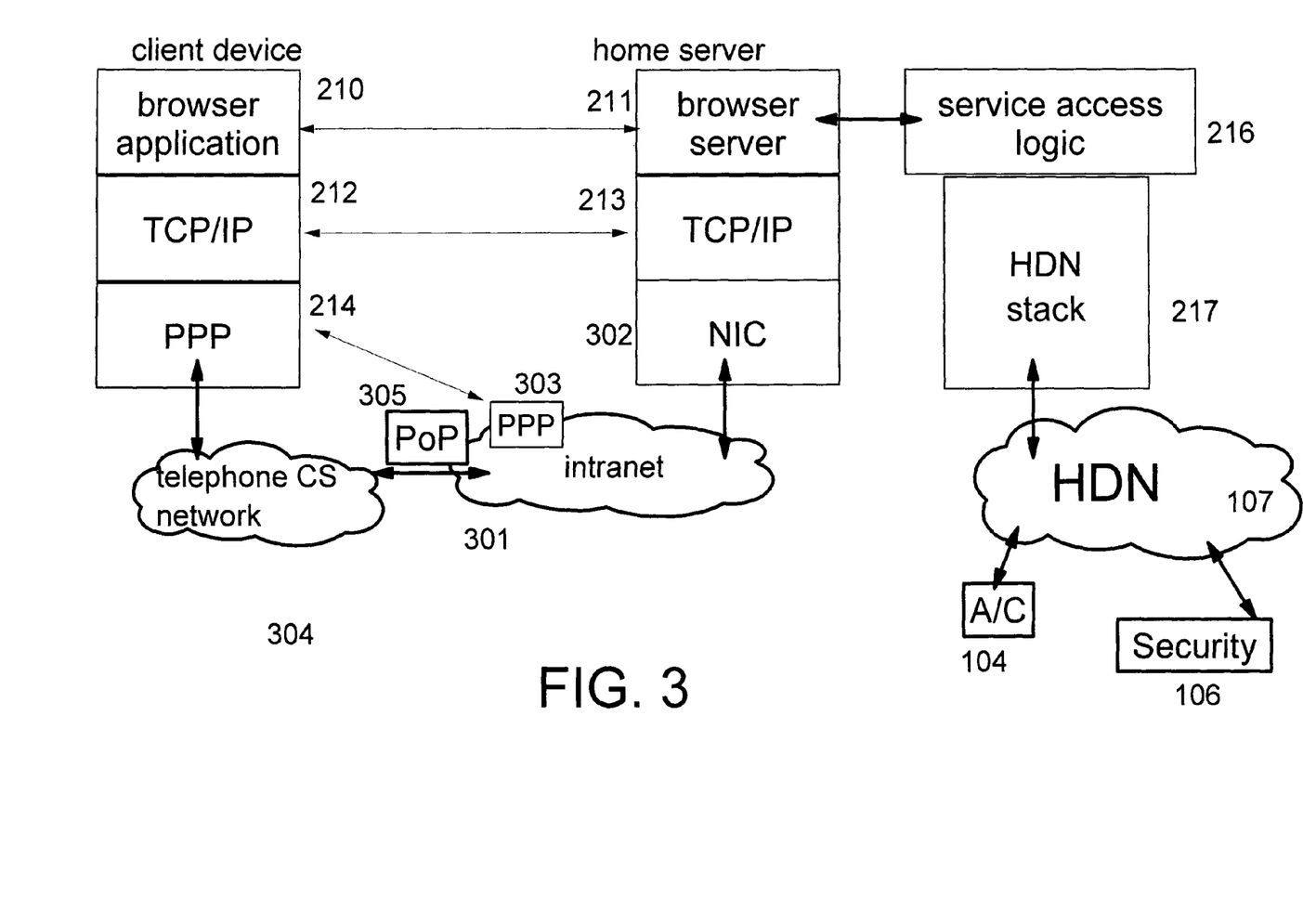
FIG. 3 shows an example of communication protocol stacks of a second example embodiment of this invention using regular cellular circuit switched network used to access the Intranet of an Internet Service Provider (ISP) through which the interactive home server and data distribution network is accessed.

FIG. 3 shows an example embodiment for such a case. For simplicity, in the figure we show a telephone circuit-switched (CS) network 304 that represents the concatenation of the wireless 108, wireline 109 and gateway 110 components shown in FIGS. 1 and 2. The home server is connected to an Intranet 301 and it could be always on, like when it is connected to a digital subscriber loop (DSL) data service or CaTV data service. Note that always on is a logical state as modern home computers can operate in a standby mode and be activated and become fully operational when traffic destined to them is detected by their network interface card (NIC) 302, e.g., an 802.3 Ethernet card, or even when one dials-in to the computer as is the case with the first embodiment.

FIG. 3 also shows dialing up the point-of-presence (PoP) 305 of the Intranet 301 of an ISP to which the home server is attached. Such ISPs are herein referred to as the home ISPs. Those skilled in the art may employ a solution in which one first dials up an ISP other than the home ISP. Such an ISP is herein referred to a the remote ISP. It is entirely possible for one to use the Intranet controlled by a remote ISP to connect to the Intranet controlled by the user's home ISP and then, eventually, connect to the user's home server. Such a solution does not depart from the spirit of this invention.

In this embodiment, the PPP protocol in the cellular phone terminates at a PPP server 303 within the Intranet prior to reaching the home server. This is a typical case experienced when one dials-up into a private, corporate, or public Internet service provider (ISP). The ISP Intranet is accessed over the circuit-switched telephone network 304 at a point-of-presence (PoP) location, which is typically represented by a telephone number to which a subscriber of the ISP calls to connect to the ISP's Intranet. Similarly to the first embodiment, the PPP entity on the ISP side 303, among other things, aids in the configuration of the TCP/IP layer 212 in the cellular phone so as to allow applications running on top of it to utilize the Intranet. In particular, the TCP/IP layer in the cellular phone 212 and the home server 213 form a logical data pipe that routes data from the browser application 210 to the browser server 211. The data could be routed through a number of link technologies over the cellular CS network and the Intranet until they finally reach the NIC in the home server 211. The various link technologies are transparent to the TCP/IP protocols and the applications running on them. Accessing of services through the HDN is done similarly to the first embodiment.

This embodiment points toward a service offering where a service provider provides access to one's home network. The service provider could be an ISP, or a third party. In either case, such a service is generally viable if secure communications between the cellular phone and the home server can be guaranteed. Thus, security processes, like secure socket layer (SSL), and/or secure IP protocol (IPSec) and/or link layer encryption and authentication, etc., should be added to secure the data path from the client to the home server. It is noted that in the first embodiment, security is less of an issue since one dials-in directly to the home server and authenticates oneself through the PPP service on the home server.

The above two embodiments, assume the use of a cellular phone that can use regular circuit-switched wireless technologies and be able to show HTML pages. Those skilled in the art, may connect other personal devices, e.g., a personal digital assistant (PDA), with web-browsing capabilities to the cellular phone prior to accessing services remotely on a home server' or place some of the home server functionality within a data network outside the home. This allows several users to subscribe to a common, third-party, virtual home-server provider. Such systems are included in the spirit and concepts of the present invention which considers the use of a long-haul, circuit switched wireless network as the network-of-choice attachment for the client device. The device is able to interact with the home server and provide visual information in the form of text and/or graphics (including images) and possibly, but not necessarily, audible and visual feedback, e.g., by switching LED indicators on the client device ON and OFF.

In alternate embodiments of the present invention, security credentials can be assigned to the user of the remote dial-up server, the home server, and/or the service access logic, shown in FIGS. 2 and 3, so that the services that are available to an individual may different from one individual to another even though both individuals access the same physical server, using the same cellular phone.

The described embodiments represent application examples of instances covered by this invention. Those skilled in the art may apply this invention in ways different than the ones described without departing from the spirit and/or concepts of this invention. As used herein and in the following claims, the term "service" includes a logical operation that can be invoked to execute an action on behalf of another entity. A remote service is a service that can be invoked remotely more particularly for this invention it includes a service that can be invoked over a wireless, circuit-switched, voice telephony system. Moreover, the term "serving entity" represents a physical entity, comprising a software and/or hardware elements, to which one can physically connect and make a request for execution of a service. The serving entity allows the physical execution of a service. For example, "controlling home environment" represents a service that does just that. With respect to FIGS. 1 and 2, the computer 103 and the software programs 211 and 216 that permit execution of the service "controlling home environment" includes the serving entity.

Figure 4:
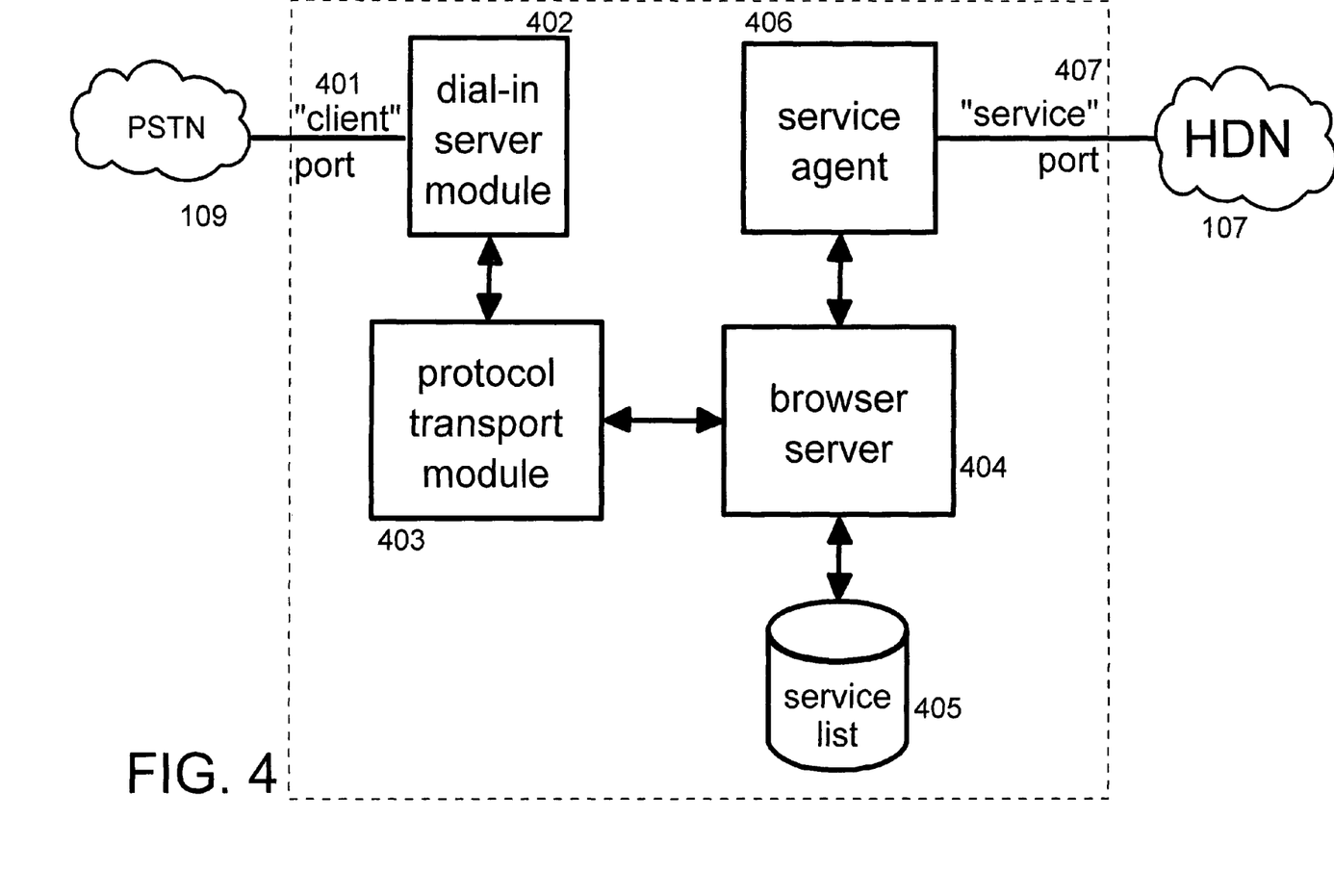
FIG. 4 shows an example of an apparatus in accordance with the present invention.

This invention may be formed as an apparatus for a user to interact with at least one service as shown in FIG. 4 for the example embodiment shown in FIG. 1. FIG. 4 does not show the user using the cell phone attached to a cellular network accessing any specific service attached to a home distribution network as shown in FIG. 1. It rather focuses on the apparatus in the middle of it all generically referred to as web server 103 in FIG. 1. As shown within the dashed box in FIG. 4, the apparatus comprises of several functional elements of which the (web) browser server is only one of them.

The apparatus includes a "client" port 401, which is a telephone port through which the apparatus attaches to the PSTN network 109. The apparatus includes a dial-in service module that implements that dial-in logic. It includes the a PSTN modem to receive the incoming call from the client device in FIG. 2 and also receive and transmit data over the PSTN network. The dial-in server module may also perform user authentication and trigger additional modules in the apparatus to process any incoming calls and requests from a client device. The protocol transport module 403 implements the protocols that are needed to transport data back and forth between the browser application in the client device, 210 in FIG. 2, and the browser server 404.

The browser server 404 is used to obtain, organize, and manipulate data that are received from or send to the client device through the protocol transport module. The data that are sent to the client device are to be displayed and viewed by the browser application in the client device. These data often include a list of services that are accessible remotely by the client device. This list of available services may reside in a service list repository 405. The data received by the browser application in the client device include a selection of at least one service that the user of the client device wants to control and also the action to be taken for the selected service, e.g., increase room temperature by 2 degrees Celsius. Upon the receipt of the action for a selected service, the browser server interacts with the particular service agent 406 that implements the control logic for controlling the selected service. The control signal generated by the service agent 406 leaves the apparatus through the "service" port 407. The service port 407 attaches the apparatus to the home distribution network (HDN) 107 via which the control signal is transmitted to the selected service. In reversing the order, the selected service may send status information over the HDN 107 to the service agent 406 through the "service" port. The service agent will process the status information and pass it to the browser server 404 to be sent for display by the browser application in the client device. The status information includes information to indicate whether the desired result has been achieved, e.g., the thermostat has received the change of temperature command and it has initiate the necessary actions required to change the room temperature.

Although as described, the apparatus described in FIG. 4 relates to the embodiment of FIG. 2. The modules of the apparatus in FIG. 2 may be implemented employing different apparatus elements in other embodiments. For example, for the embodiment in FIG. 3, the dial-in server module is implemented at an apparatus at the premises of an ISP, while the browser server is implemented at an apparatus in a private house. Those skilled in the art may partition the modules of the apparatus in FIG. 4 in different ways than the one described without departing from the spirit and scope of this invention.

This invention may be also be implemented as an apparatus for a user to interact with at least one remote service by implementing the steps of the methods of this invention. Thus, an example apparatus includes: user connecting means for said user connecting to a serving entity using a client device attached to a wireless, circuit-switched, voice telephony network; user viewing means for obtaining and viewing a list of accessible remote services from said serving entity; user selecting means for selecting said at least one remote service from said list; and user access means for accessing and viewing said at least one remote service in obtaining desired results.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after either or both of the following conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. A service interaction method comprising a user interacting with at least one remote service accessible through a home data distribution network, said home data distribution network comprising an aggregation of at least one communications media and at least one communications protocol used to access said at least one remote service from a serving entity, the step of interacting comprising: enabling remote control of services at a residential network without the necessity of a service provider; employing only a circuit-switched, voice telephony network comprising a cellular, circuit-switched, voice telephony network one of a cellular voice network and a PSTN, said user connecting to a telephone modem in a serving entity, the serving entity attached to said home data distribution network only using a cellular phone attached to the circuit switched, voice telephony network comprising a cellular, circuit-switched, voice telephony network a wireless, circuit switched, voice telephony network, enabling remote control of services at the home data distribution network only by the circuit-switched, voice telephony network comprising a cellular circuit switched network; obtaining and viewing a list of at least one remote service from accessible remote services from said serving entity accessible remotely via said home network from said serving entity using at least one of said communications media and one of said communications protocols; selecting said at least one remote service from said list; selecting said at least one communications media and at least one communications protocol that said at least one remote service uses; and accessing and viewing said at least one remote service in obtaining desired results.

2. A method as recited in claim 1, wherein the step of connecting includes dialing-up directly to the serving entity.

3. A method as recited in claim 2, wherein the step of dialing-up directly to the service entity further includes passing dialing signaling and control data to the serving entity through an intermediary data network.

4. A method as recited in claim 1, wherein the step of viewing is performed employing a viewing device collocated with said cellular phone.

5. A method as recited in claim 4, wherein the step of viewing is performed employing a web-browser and the serving entity is a web-server.

6. A method as recited in claim 1, wherein the viewing device depicts information in a form including at least one of: text, graphics, images, light display, voice or any combination of these.

7. A method as recited in claim 1, wherein the step of selecting includes employing a menu.

8. A method as recited in claim 1, wherein the step of connecting includes dialing-up to the serving entity through a data network to which the serving entity is connected.

9. A method as recited in claim 8, wherein the data network is the Intranet controlled by an Internet Service Provider.

10. A method as recited in claim 8, wherein the data network uses the TCP/IP protocol suite for transporting information.

11. A method as recited in claim 8, wherein the step of dialing-up to the serving entity through a data network, further includes dialing-up to the serving entity through a sequence of at least one data network, the last one of which the serving entity is attached to.

12. A method as recited in claim 1, further comprising said serving entity employing attributes of said circuit switch network in authenticating said user.

13. A method as recited in claim 12, wherein said attributes include a telephone number of said cellular phone.

14. A method as recited in claim 12, wherein said attributes include a telephone number of said serving entity.

15. A method as recited in claim 1, further comprising establishing credentials so that said at least one remote service can be manipulated in a secure manner on the serving entity.

16. A method as recited in claim 1, wherein the step of viewing views the list on a viewing device in a manner that depends on the user's access privileges to said at least one remote service.

17. A method as recited in claim 1, further comprising the serving entity providing access to at least one service agent used to access and control said at least one remote service.

18. A method as recited in claim 17, wherein at least one of said at least one service agent is a computer software module executable on a computer.

19. A method as recited in claim 18, further comprising activating said software module prior to invoking a particular remote service.

20. A method as recited in claim 18, further comprising activating said software module on demand after a particular remote service has been invoked.

21. A method as recited in claim 18, further comprising storing said software module at a data repository.

22. A method as recited in claim 21, further comprising dynamically retrieving and activating said software module from the data repository after invoking a particular remote service.

23. A method as recited in claim 1, wherein said cellular, circuit-switched, voice telephony network is a first generation, analog, cellular network.

24. A method as recited in claim 1, wherein said cellular wireless, circuit-switched, voice telephony network is a second generation, digital, cellular network.

25. A program storage device readable by machine, tangibly embodying a program of instructions executable by the machine to perform method steps for causing a user to interact with at least one remote service, said method steps comprising the steps of claim 1.

26. The service interaction method of claim 1 wherein the circuit-switched, voice telephony network comprising a cellular, circuit-switched, voice telephony network consists only of the cellular, circuit-switched, voice telephony network.

27. The service interaction method of claim 1 wherein the circuit-switched, voice telephony network comprising a cellular, circuit-switched, voice telephony network consists only of one each of a cellular, circuit-switched, voice telephony network and a PSTN.

28. An apparatus for a user to interact with at least one remote service, comprising:
- user connecting means for said user connecting to a serving entity using only a cellular phone attached to a circuit-switched, voice telephony network comprising a cellular, circuit-switched, voice telephony network, said user connecting means employing only a circuit-switched, voice telephony network comprising a cellular, circuit-switched, voice telephony network, and enabling remote control of services at a residential network only by the cellular phone through the circuit-switched, voice telephony network comprising a cellular, circuit-switched, voice telephony network;
- user viewing means for obtaining and viewing a list of accessible remote services from said serving entity;
- second connecting means for attaching said apparatus to a communications medium and using a communications protocols, taken from an aggregation of communication media and protocols, through which said at least one remote service can be accessed;
- user selecting means for selecting said at least one remote service from said list;
- second selecting means for selecting the communications medium and protocol to access said selected at least one service; and
- user access means for accessing and viewing said at least one remote service in obtaining desired results.

29. An apparatus for a user using a cellular phone attached to a cellular, circuit-switched, voice telephony network, to interact with at least one service on said home network, comprising: a home network and a system; the system comprising: a telephone modem to directly receive an incoming call from the cellular phone over a circuit-switched, voice telephony network comprising a cellular, circuit-switched, voice telephony network, and also to receive and transmit data over the circuit-switched, voice telephony network comprising a cellular, circuit-switched, voice telephony network said telephone modem having a client port through which the system attaches to the circuit-switched, voice telephony network comprising a cellular, circuit-switched, voice telephony network and a service port through which the system attaches to the home network, said system being a single system through which a user with the cellular phone can establish communication in one step directly through the cellular phone and the circuit-switched, voice telephony network comprising a cellular, circuit-switched, voice telephony network, a dial-in server module to implement dial-in logic for the cellular phone; a browser server module for managing data for remote display; and a protocol transport module to implement protocols needed to transport data back and forth between a browser application in the cellular phone and said browser server module, wherein interaction with at least one service on said home network by said cellular phone occurs through said apparatus.

30. An apparatus as recited in claim 29, wherein said browser server is used to obtain, organize, and manipulate data received from and data sent to the cellular phone through the protocol transport module.

31. An apparatus as recited in claim 30, wherein said data sent to the cellular phone are displayed and viewed by the browser application in the cellular phone.

32. An apparatus as recited in claim 30, wherein said data sent includes a list of services that are accessible by the cellular phone.

33. An apparatus as recited in claim 29, wherein said data received by the browser application in the cellular phone include a selection of at least one service the user of the cellular phone controls and an action to be taken for a selected service, and upon receipt of the action the browser server interacts with a particular service agent to implement the control logic for controlling the selected service, wherein a control signal generated by the service agent exits the apparatus through attachment of the home network.

34. An apparatus as recited in claim 29, wherein said dial-in server module triggers at least one particular module in the apparatus to process any incoming calls and requests from the cellular phone.

35. An apparatus as recited in claim 29, wherein said dial-in server module performs user authentication.

36. An apparatus as recited in claim 29, wherein the apparatus further comprises selective implementation capability of limiting the apparatus capability to any combination of the following limitations:

said browser server is used to obtain, organize, and manipulate data received from and data sent to the cellular phone through the protocol transport module;

said data sent to the cellular phone client device are displayed and viewed by the browser application in the cellular phone;

said data sent includes a list of services that are accessible by the cellular phone;

said data received by the browser application in the cellular phone include a selection of at least one service the user of the cellular phone controls and an action to be taken for a selected service, and upon receipt of the action the browser server interacts with a particular service agent to implement the control logic for controlling the selected service, wherein a control signal generated by the service agent exits the apparatus through attachment of the home network;

said dial-in server module triggers at least one particular module in the apparatus to process any incoming calls and requests from the cellular phone; and said dial-in server module performs user authentication.

* * * * *